United States Patent [19]

Appenzeller et al.

[11] Patent Number: 4,858,307
[45] Date of Patent: Aug. 22, 1989

[54] HOIST MECHANISM FOR ASSISTING IN MANUAL MOVEMENT OF A STATOR COIL INSERTION TOOL ASSEMBLY

[75] Inventors: Robert C. Appenzeller, Washington Township, Montgomery County; Curtis R. Bailey, Dayton, both of Ohio

[73] Assignee: Machine Products Corporation, Dayton, Ohio

[21] Appl. No.: 307,947

[22] Filed: Feb. 9, 1989

[51] Int. Cl.$^4$ .............................................. H02K 15/06
[52] U.S. Cl. .......................................... 29/736; 29/596
[58] Field of Search ................ 29/732, 734, 736, 596

[56] References Cited

U.S. PATENT DOCUMENTS 4,428,112  1/1984  Hattori .................................. 29/734

Primary Examiner—Carl E. Hall
Attorney, Agent, or Firm—Jacox & Meckstroth

[57] ABSTRACT

Hoist assist mechanism which assists in the manual movement of a coil insertion tool assembly to and from an operational position. The hoist assist mechanism has a rotatable base, to which is attached an upwardly extending post. At the upper portion of the post is a sheave. Also, attached to the base, adjacent the post, is a support arm which supports a coil insertion tool assembly. The support arm is pivotally attached to the rotatable base. A cable is attached to the arm. The cable extends over the sheave and is also attached to a spring which assists in pivotal movement of the arm. The spring is adjacent the post or enclosed by the post. Preferably, plurality of posts and arms are pivotally attached to the base. Each pivotal arm supports a coil insertion tool assembly. Thus, coil insertion tool assemblies for different stator cores can be easily and readily moved into and out of operational position as desired.

24 Claims, 3 Drawing Sheets

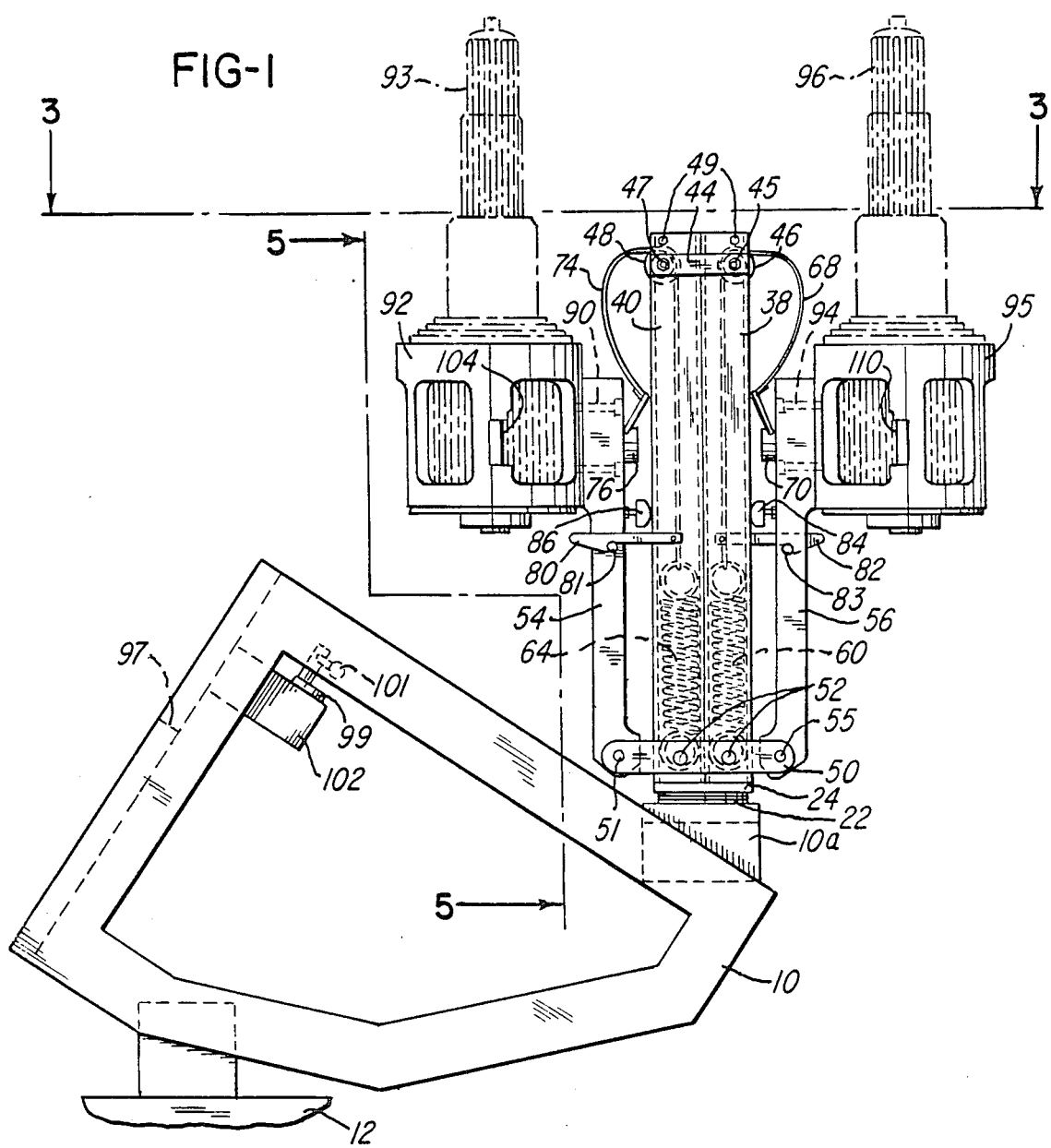

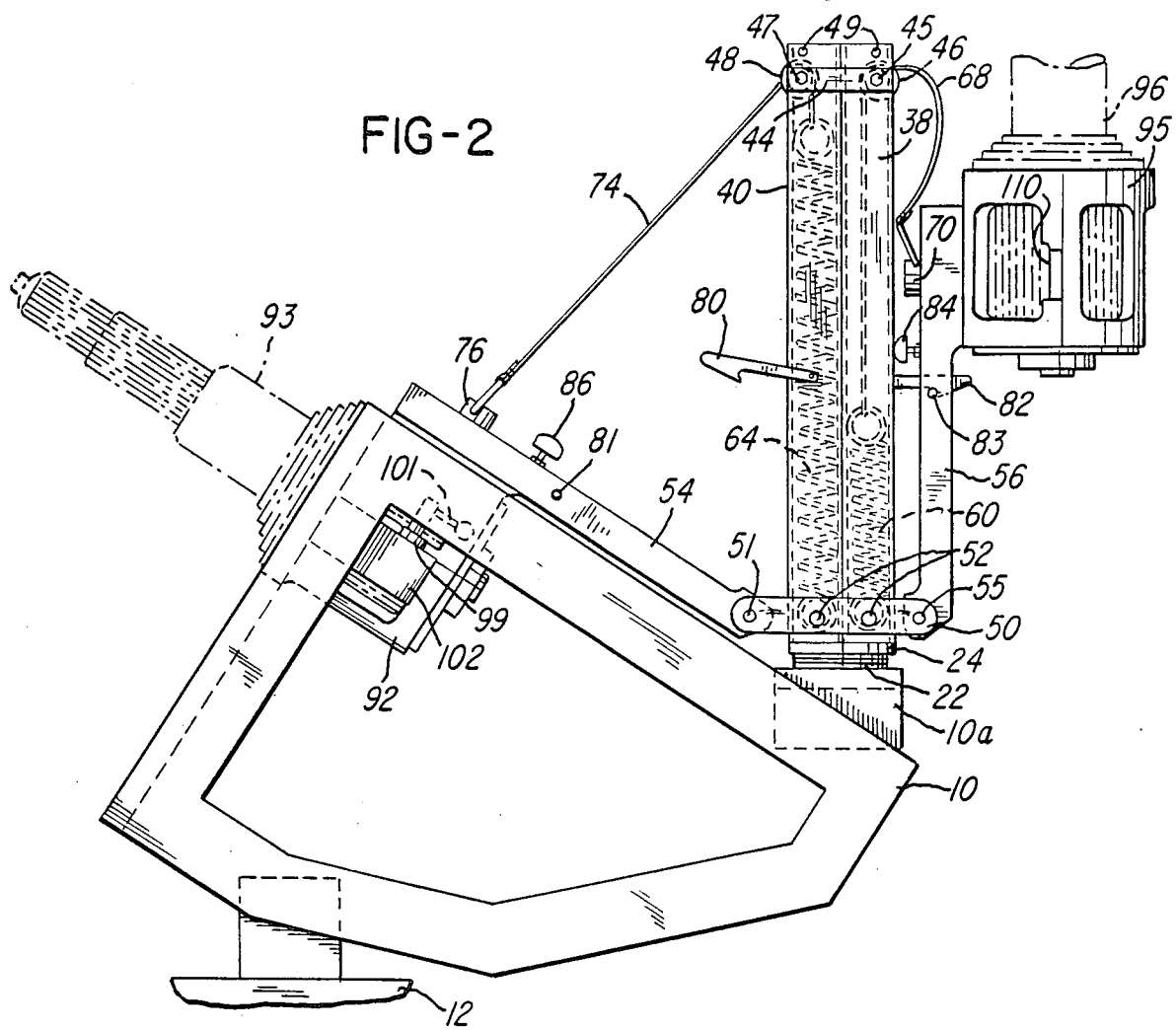
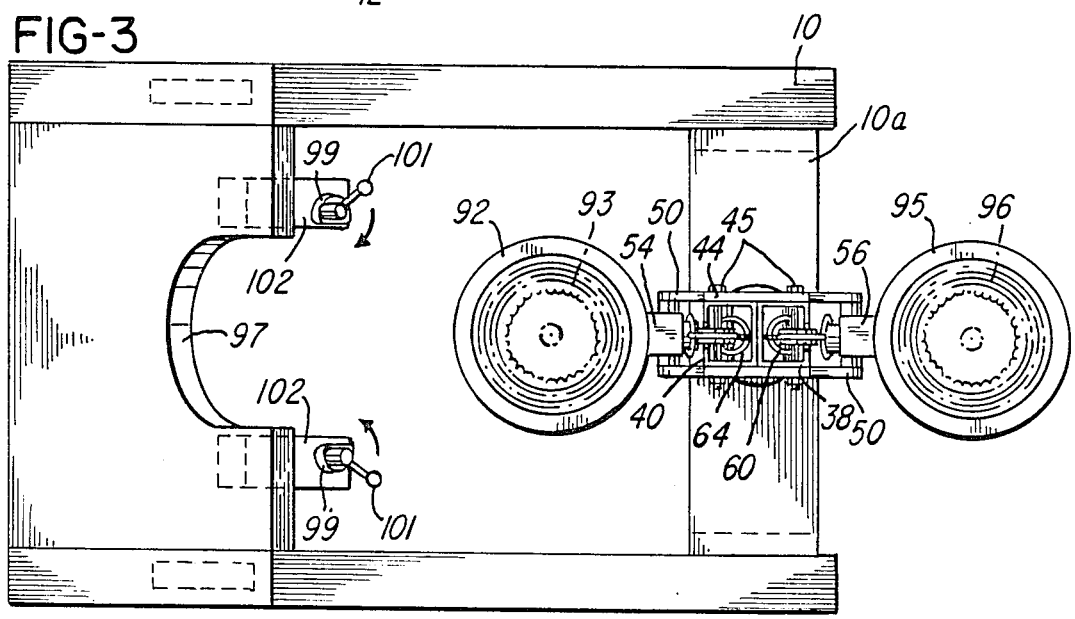

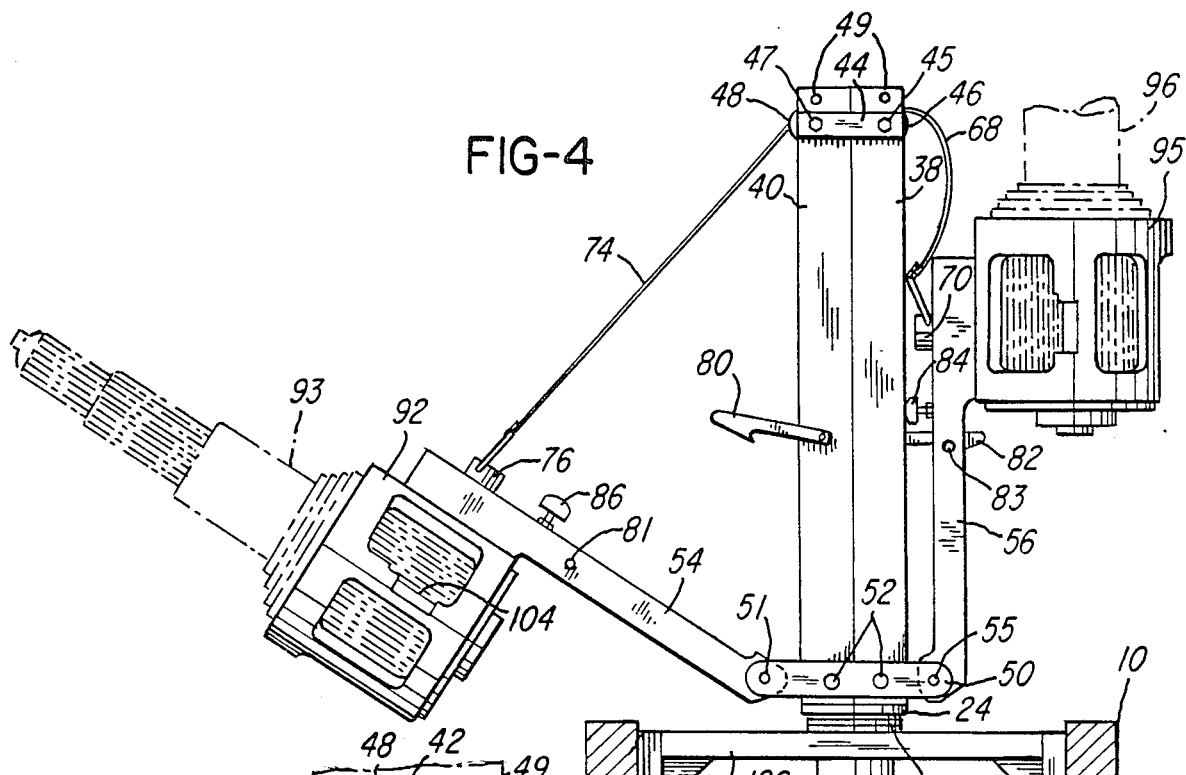
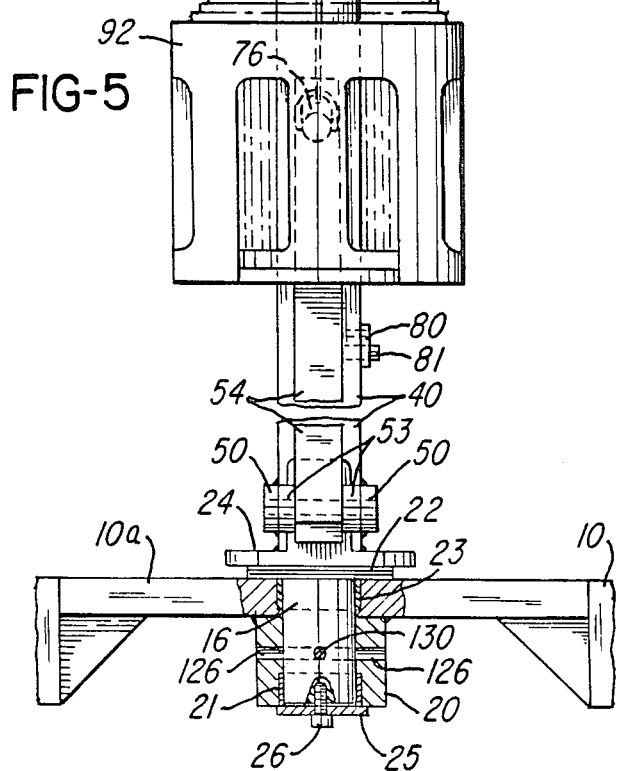

HOIST MECHANISM FOR ASSISTING IN MANUAL MOVEMENT OF A STATOR COIL INSERTION TOOL ASSEMBLY

BACKGROUND OF THE INVENTION

A stator core of an electric motor may be any one of various sizes and coil arrangements. Therefore, a tool assembly for insertion of coils into the stator core of an electric motor must be particularly designed and constructed for insertion of coils into that stator core.

Therefore, in a facility in which coils are inserted into stator cores of various sizes and coil arrangements, several coil insertion tool assemblies must be used.

For insertion of coils into stator cores of a given size and a given coil arrangement, a coil insertion tool assembly is positioned in an operational position within operational apparatus which operates the coil insertion tool assembly. Then the operational apparatus operates the coil insertion tool assembly and coils are inserted into stator cores of the given size and of a given coil arrangement as the stator cores are processed upon, one after the other.

When it is desired to insert coils into stator cores of another size and/or another coil arrangement, the coil insertion tool assembly is removed from the operational apparatus and another coil insertion tool assembly is positioned within the operational apparatus. A coil insertion tool assembly is heavy and difficult to handle. However, such replacement of a coil insertion tool into the operational apparatus is conventionally performed manually with great physical effort and with potential safety hazard involved.

It is an object of this invention to provide mechanism which assists in the manual movement of a coil insertion tool assembly into and out of an operational position in operational apparatus.

It is another object of this invention to provide such mechanism which can be constructed at relatively low costs.

Other objects and advantages of this invention reside in the construction of the mechanism and the parts thereof, the combination thereof, the method of construction and the mode of operation, as will become more apparent from the following description.

SUMMARY OF THE INVENTION

The hoist assist mechanism of this invention comprises support structure to which a base member is attached. A support arm is pivotally mounted upon a base member. Adjacent the support arm is a post. Adjacent the post is a resilient member. The post supports a rotatable support member, such as a sheave or pulley wheel. A cable attaches the support arm to the resilient member. The cable extends over the rotatable support member between the resilient member and the support arm.

Means are provided for attaching a coil insertion tool assembly to the support arm. The support arm is pivotal to move the coil insertion tool assembly to an operational position at which the coil insertion tool assembly is operated. The support arm is also pivotal to move the coil insertion tool from the operational position.

A coil insertion tool assembly is a relatively heavy item. However, the resilient member, which is attached to the support arm by means of the cable, assists in pivotal movement of the support arm as the support arm carries a coil insertion tool assembly to and from an operational position. Preferably, the base member is rotatable. Thus, with rotative movement of the base member the support arm and a coil insertion tool assembly carried thereby can be moved to and from alignment with the operational position.

Also, preferably, a plurality of arms is pivotally attached to the base member. Thus, a coil insertion tool assembly of a certain size can be attached to one of the support arms, and a coil insertion tool assembly of a different size can be attached to another support arm. Thus, each support arm may have a different coil insertion tool assembly attached thereto. Therefore, by rotative movement of the base a desired coil insertion tool assembly is positioned into alignment with the operational position, and with pivotal movement of the support arm, the desired coil insertion tool assembly can be readily moved into the operational position.

Furthermore, due to the fact that the base member, to which the support arms are pivotally attached, is rotatable, a support arm can be moved to a position at which a coil insertion tool assembly can be readily attached to the support arm or removed therefrom.

BRIEF DESCRIPTION OF THE VIEWS OF THE DRAWINGS

FIG. 1 is a side elevational view illustrating hoist assist mechanism of this invention as the mechanism is mounted upon support structure. This figure shows a plurality of arms, each of which has a coil placement tool assembly attached thereto. This figure also shows each of the coil placement tool assemblies out of operating position.

FIG. 2 is a side elevational view, similar to FIG. 1, but showing one of the coil placement tool assemblies supported directly by the support structure and in an operating position.

FIG. 3 is a top plan view or sectional view taken substantially on line 3—3 of FIG. 1.

FIG. 4 is a front elevational view showing the hoist assist mechanism in a position substantially ninety degrees with respect to the position shown in FIGS. 1, 2, and 3. In this position of the support arm, a coil placement tool assembly which is carried by the arm can be readily removed from the arm.

FIG. 5 is a sectional view taken substantially on line 5—5 of FIG. 1.

DETAILED DESCRIPTION OF THE PREFERRED EMBODIMENT

FIG. 1 shows support structure 10 which is supported by a pedestal 12. The support structure 10 includes a cross member 10a, shown in FIGS. 3, 4, and 5. Extending through the cross member 10a is a stem 16, which is rotatable within a block 20, as best shown in FIG. 5. Bearing members 21 and 23 encompass the stem 16. A plate 25, below the block 20, is attached to the stem 16 by a bolt 26. Attached to the stem 16 above the cross member 10a is a bearing 22. Immediately above the bearing 22 and attached thereto is base 24. The base 24 and the bearing 22 are rotatable with rotation of the stem 16.

Attached to the base 24 and extending therefrom is an upwardly extending post 38 and an upwardly extending post 40. The posts 38 and 40 are in parallel juxtaposition. Each of the posts 38 and 40 has a slot 42 therein at the upper portion thereof, as shown in FIG. 5. Attached to the upper portion of the posts 38 and 40 are plates 44.

A shaft member 45 extends through the plates 44 and through the slot 42 of the post 38. A shaft member 47 extends through the plates 44 and through the slot 42 of the post 40. The shaft member 45 rotatably supports a sheave or pulley wheel 46, and the shaft member 47 rotatably supports a sheave or pulley wheel 48. Each of the sheaves 46 and 48 is within the slot 42 of its respective post 38 and 40. Also, above the shafts 45 and 47 and above the sheaves 46 and 48 are bolts 49 which extend through the posts 38 and 40 and through the slots 42.

On opposite sides of the base 24 are plates 50. Pin members 52 extend through the plates 50 and through the base 24 for attachment of the plates 50 to the base 24. A pin 51 pivotally attaches an arm 54 to the plates 50. Spacer elements 53 are positioned between the base 24 and the plates 50. A pin 55 pivotally attaches an arm 56 to the plates 50.

Within the post 38 is a spring member 60, which has a lower end attached to the post 38 by means of one of the pins 52. Within the post 40 is a spring member 64, which has a lower end attached to the post 40 by means of one of the pins 52.

The upper end of the spring member 60 is attached to a cable 68, which extends upwardly from the spring member 60 and within the post 38. The cable 68 extends over the pulley wheel 46. From the pulley wheel 46 and from the post 38 the cable 58 extends to the arm 54. The cable 58 is attached to a knob 70 which is attached to the arm 56. Thus, the cable 68 is attached to the arm 56.

The upper end of the spring member 64 is attached to a cable 74, which extends upwardly from the spring member 64 and within the post 40. The cable 74 extends over the pulley wheel 48. From the pulley wheel 48 and from the post 40 the cable 74 extends to the arm 54. The cable 68 is attached to a knob 76 which is attached to the arm 54. Thus, the cable 74 is attached to the arm 54.

The post 40 has a latch 80 pivotally attached thereto. The latch 80 engages a pin 81 which is attached to the arm 54 to retain the arm 54 in an upwardly extending position. The post 38 has a latch 82 pivotally attached thereto. The latch 82 engages a pin 83 which is attached to the arm 56 to retain the arm 56 in an upwardly extending position. The arm 56 has an abutment element 84 attached thereto. When the arm 56 is in an upwardly extending position, the abutment 84 engages the housing 38. The arm 54 has an abutment element 86 attached thereto. When the arm 54 is in an upwardly extending position, the abutment 86 engages the housing 40.

Attached to the arm 54 by means of bolts 90 is carrier 92. The carrier 92 retains a coil insertion tool assembly 93. Attached to the arm 56 by means of bolts 94 is a carrier 95 which retains a coil insertion tool assembly 96.

When it is desired to employ the coil insertion tool assembly 93 for insertion of coils into an electric motor stator core, not shown, the latch 80 is released from the pin 81 of the arm 54, and the arm 54 is pivotally lowered until the carrier 92 rests upon an arcuate cradle 97, which is shown in FIG. 3. The cradle 97 is a part of the support structure 10. Lowering of the arm 54 from the position thereof shown in FIG. 1 to the position thereof shown in FIG. 2 is performed manually. When the arm 54 is pivotally moved from the position thereof shown in FIG. 1 to the position thereof shown in FIG. 2, the cable 74 moves with the arm 54, and the cable 74 moves upon the sheave 48. The cable 74 pulls upon the spring 64. Thus, the spring 64 is stretched, as illustrated in FIG. 2. As the spring 64 is stretched, the spring 64 assists in supporting the weight of the coil insertion tool assembly 93, as the coil insertion tool assembly 93 is supported by the carrier 92 and the arm 54. Thus, even though the coil insertion tool assembly is heavy, customarily weighing several hundred pounds, the arm 54 with the load carried thereby can be easily manually moved. FIG. 2 shows the carrier 92 and the coil insertion tool assembly 93 resting upon the cradle 97.

The carrier 92 is secured in its position upon the cradle 97 by cam elements 99, which are operated by cranks 101. The cranks 101 and the cams 99 are supported by support members 102. The cam elements 99 are movable into notches 104 in the carrier 92. Thus, the carrier 92 and the coil insertion tool assembly 93 are positioned and secured for operation of the coil insertion apparatus by operational apparatus, not shown, which is supported by or adjacent the support structure 10.

After use of the coil insertion tool assembly 93 for placing coils into a number of stator cores, not shown, the carrier 92 is released by releasing the cams 99. Then the arm 54 is manually pivotally moved upwardly. When the arm 54 is pivotally manually moved upwardly, the spring 64 assists in lifting the arm 54 and the load carried thereby, which consists of the coil insertion tool assembly 93 and the carrier 92. Thus, the coil insertion tool assembly 93 can be manually moved upwardly without difficulty, as the spring 64 assists in the upward movement. The coil insertion tool assembly 93 is thus returned to the position thereof shown in FIG. 1. In this position, the latch 80 retains the arm 54 in its upwardly extending position.

If it is desired to insert coils into a stator core of another given size or configuration, a coil insertion tool assembly 96 is employed. The coil insertion tool assembly 96 is shown within a carrier 95, which is mounted upon the arm 56. In order to position the coil insertion tool assembly 96 for use, the base 24 is rotatively moved through a 180 degree angle. In this rotative position of the base 24, the arm 56 and the coil insertion tool assembly 96 are positioned immediately above the support structure 10. Then the latch 82 is moved from the pin 83 and from the arm 56. Then the arm 56 is pivotally moved downwardly until the carrier 95 rests upon the cradle 97. Downward movement of the arm 56 with the load carried thereby is assisted by the spring 60 and the cable 68. The carrier 95 has notches 110, which receive the cams 99 to secure the carrier 95 and the coil insertion tool assembly 96 in position in the cradle 97 for insertion of coils into a stator core.

When it is desired to remove a coil insertion tool assembly, such as the coil insertion tool assembly 93, from its support arm 54, the base 24 is rotatively moved through a 90 degree angle, to a position shown in FIG. 4. Then the coil insertion tool assembly 93 and the carrier 92 are at a side portion of the support structure 10, and the coil insertion tool assembly 93 is readily accessible and can be readily removed from the arm 54.

As shown in FIG. 5, the block 20 and the stem 16 are provided with transverse passages 126 therein. Thus, a rod 130, or the like can be inserted into a passage 126 to secure the rotative position of the base 24.

In summary, it is thus to be understood that the hoist assist mechanism of this invention provides means by which a heavy coil insertion tool assembly can be easily and readily manually moved to and from an operational position. The mechanism of this invention is capable of supporting a plurality of coil insertion tool assemblies.

Any one of the coil insertion tool assemblies can be easily and readily moved into an operational position.

Also, the hoist assist mechanism of this invention functions to permit a coil insertion tool assembly to be easily and readily attached to the mechanism and detached therefrom.

Although the preferred embodiment of the hoist assist mechanism of this invention has been described, it will be understood that within the purview of this invention various changes may be made in the form, details, proportion and arrangement of parts, the combination thereof, the mode of construction, and the mode of operation, which generally stated consist in hoist assist mechanism within the scope of the appended claims.

The invention having been described, the following is claimed.

1. Hoist mechanism for assisting in manual movement of a coil insertion tool assembly with respect to support structure which is provided with a support portion which supports a coil insertion tool assembly in an operational position, comprising a base, means attaching the base to the support structure, an arm, means pivotally attaching the arm to the base, means for attaching a coil insertion tool assembly to the arm, the arm being pivotally movable to move a coil insertion tool assembly which is attached thereto to the support portion of the support structure for support of the coil insertion tool assembly by the support portion of the support structure, the arm being pivotally movable to move a coil insertion tool assembly from the support portion of the support structure, a resilient member, means attaching the resilient member to the base, a cable, means attaching the cable to the arm, means attaching the cable to the resilient member, whereby the resilient member assists in pivotal movement of the arm as the arm is pivotally moved to move a coil insertion tool assembly to the support portion of the support structure for support of the coil insertion tool assembly by the support structure and whereby the resilient member assists in pivotal movement of the arm for removal of the coil insertion tool assembly from the support portion of the support structure.

2. The hoist mechanism of claim 1 in which the means attaching the base to the support structure includes rotatable means, the base having a first rotative position and a second rotative position, a plurality of arms attached to the base, there being a first arm and a second arm, means for attaching a first coil insertion tool assembly to the first arm, means for attaching a second coil insertion tool assembly to the second arm, a plurality of resilient members, a plurality of cables, there being a cable attached to each arm and to each of the resilient members, the first coil insertion tool assembly being in alignment with the support portion of the support structure when the base is in the first rotative position thereof, and when the base is in the first rotative position the first insertion tool assembly can be moved directly by the first arm to and from the support portion of the support structure, the second coil insertion tool assembly being in alignment with the support portion of the support structure when the base is in the second rotative position thereof, and when the base is in the second rotative position the second coil insertion tool assembly can be moved by the second arm to and from the support portion of the support structure.

3. The hoist mechanism of claim 1 which includes a post attached to the base, a sheave rotatively supported by the post, the cable engaging the sheave between the arm and the resilient member.

4. The hoist mechanism of claim 1 which includes a post vertically positioned upon the base and attached to the base, the post having an upper portion, a sheave rotatably attached to the upper portion of the post, the cable engaging the sheave between the arm and the resilient member.

5. The hoist mechanism of claim 1 which includes a plurality of arms pivotally attached to the base, a plurality of posts vertically positioned upon the base and attached to the base adjacent the arms, each post having an upper portion, a plurality of sheaves, there being a sheave rotatably attached to the upper portion of each of the posts, a plurality of resilient members, means attaching each resilient member to the base, a plurality of cables, there being a cable attached to each arm and to each of the resilient members and in engagement with each of the sheaves.

6. The hoist mechanism of claim 1 in which the resilient member is an elongate coil spring, means connecting one end of the elongate coil spring to the base and means connecting the opposite end of the elongate coil spring to the cable.

7. The hoist mechanism of claim 1 which includes a post vertically positioned upon the base and attached to the base, the post having an upper portion, a sheave rotatably attached to the upper portion of the post, the cable engaging the sheave between the arm and the resilient member, the resilient member including an elongate coil spring, means connecting one end of the elongate coil spring to the base and means connecting the opposite end of the elongate coil spring to the cable.

8. Apparatus for assisting in manual movement of a coil insertion tool assembly with respect to support structure which supports a coil insertion tool assembly in an operational position, comprising:

a base, means supporting the base upon the support structure, an upwardly extending elongate post, means attaching the elongate post to the base, an elongate arm, means pivotally attaching the elongate arm to the base adjacent the elongate post, the elongate arm having a first pivotal position, the first pivotal position of the arm being an upwardly extending position adjacent the elongate post, attachment means for attaching a coil insertion tool assembly to the arm, resilient means adjacent the post, means connecting the resilient means to the base, a sheave attached to the elongate post, a cable attached to the resilient means and extending therefrom, the cable engaging the sheave, means attaching the cable to the arm, the arm having a second pivotal position, the arm in the second pivotal position thereof being angular with respect to the elongate post, whereby a coil insertion tool assembly which is carried by the arm is in an operational position when the arm is in the second pivotal position thereof, the arm being pivotally moved between the first pivotal position thereof of the second pivotal position thereof with the assistance of the resilient means, the resilient means thus assisting in movement of a coil insertion tool assembly which is carried by the arm as the coil insertion tool assembly is moved to and from the operational position thereof.

9. The apparatus of claim 8 in which the post includes an enclosure which encloses the resilient means.

10. The apparatus of claim 8 in which the elongate post comprises a housing with enclosure walls, the resilient means being positioned within the housing.

11. The apparatus of claim 8 in which the resilient means includes an elongate coil spring having an end portion attached to the cable.

12. The apparatus of claim 8 in which the elongate post is substantially vertical and has an upper portion and in which a sheave is attached to an upper portion of the post, the cable being in engagement with the sheave between the arm and the resilient means.

13. The apparatus of claim 8 in which the means supporting the base upon the support structure includes rotatable means.

14. The apparatus of claim 8 which includes latch means attached to the post and engageable with the elongate arm for maintaining the elongate arm in the first pivotal position thereof.

15. The apparatus of claim 8 which includes a second post, means attaching the second post to the base, a second elongate arm, means pivotally attaching the second elongate arm to the base, second attachment means, the second attachment means for attaching a coil insertion tool assembly to the second arm, second resilient means, the second resilient means being adjacent the second post, a second sheave, the second sheave being attached to the second elongate post, a second cable, the second cable being attached to the second arm and engaging the second sheave and attached to the second resilient means, the second arm having a first pivotal position adjacent the elongate post and a second pivotal position which is angular with respect to the elongate post.

16. The apparatus of claim 8 which includes a second post, attaching the second post to the base, a second elongate arm, means pivotally attaching the second elongate arm to the base, second attachment means, the second attachment means for attaching a coil insertion tool assembly to the second arm, second resilient means, the second resilient means being adjacent the second post, a second sheave, the second sheave being attached to the second elongate post, a second cable, the second cable being attached to the second arm and engaging the second sheave and attached to the second resilient means, the second arm having a first pivotal position adjacent the elongate post and a second pivotal position which is angular with respect to the elongate post, the means for supporting the base upon the support structure being rotatable means, the base being rotatably movable to position either of the arms for pivotal movement thereof to position the coil insertion tool assembly which is carried thereby in an operational position.

17. Hoist assist mechanism for manual movement of a coil insertion tool comprising: support structure which includes a support portion for supporting a coil insertion tool assembly, carrier means movable with respect to the support structure, means for attachment of a coil insertion tool assembly to the carrier means, resilient means, means connecting the resilient means to the support structure, and means connecting the resilient means to the carrier means, the carrier means being movable to and from the support portion of the support structure, whereby the resilient means assists in movement of the carrier means as the carrier means supports a coil insertion tool and as the carrier means moves the coil insertion tool assembly to and from the support portion of the support structure.

18. The hoist assist mechanism of claim 17 in which the support structure includes an upstanding portion, a rotatable support member attached to the upstanding portion of the support structure, a cable extending over the rotatable support member and in engagement therewith, means attaching the cable to the resilient means, and means attaching the cable to the carrier member.

19. Hoist assist mechanism for assisting in the movement of a coil insertion tool assembly, comprising support structure, a base, means attaching the base to the support structure, a post attached to the base and extending upwardly therefrom, the post having an upper portion, a sheave rotatably attached to the upper portion of the post, a resilient member, means attaching the resilient member to the base, a support arm, means pivotally attaching the support arm to the base adjacent the post, means for attaching a coil insertion tool assembly to the support arm, the support arm having a first pivotal position which is substantially parallel to the post, the support structure including a cradle portion for receiving a coil insertion tool assembly which is carried by the support arm, the support arm having a second position in which a coil insertion tool assembly which is carried by the support arm is positioned in the cradle portion of the support structure, a cable, means attaching the cable to the resilient member, the cable being in engagement with the sheave, means attaching the cable to the support arm, whereby the resilient member and the cable assist in pivotal movement of the support arm between the first pivotal position thereof and the second pivotal position thereof.

20. The hoist assist mechanism of claim 19 in which the means attaching the base to the support structure comprises rotatable means, the base having a rotatable position in which the arm is in alignment with the cradle portion of the support structure for movement of a coil insertion tool assembly which is carried by the arm to and from the cradle portion, the base having a rotatable position in which the arm is out of alignment with the cradle portion of the support structure.

21. The hoist assist mechanism of claim 19 in which the resilient member comprises an elongate coil spring.

22. The hoist assist mechanism of claim 19 in which the resilient member comprises an elongate coil spring and in which the post comprises an enclosure for the elongate coil spring.

23. The hoist assist mechanism of claim 19 which includes a latch attached to the post and engageable with the arm to retain the arm in the first pivotal position thereof.

24. The hoist assist mechanism of claim 19 which includes retainer means carried by the support structure for retaining the coil insertion tool assembly in the cradle.

* * * * *

UNITED STATES PATENT AND TRADEMARK OFFICE
CERTIFICATE OF CORRECTION

PATENT NO. : 4,858,307
DATED : August 22, 1989
INVENTOR(S) : Robert C. Appenzeller and Curtis R. Bailey It is certified that error appears in the above-identified patent and that said Letters Patent is hereby corrected as shown below:

Column 7, line 35, after the first comma insert ---means---.

Signed and Sealed this

Thirty-first Day of July, 1990

Attest:

HARRY F. MANBECK, JR.

Attesting Officer

Commissioner of Patents and Trademarks